(12) United States Patent
Niese

(10) Patent No.: US 11,271,445 B2
(45) Date of Patent: Mar. 8, 2022

(54) METHOD FOR FASTENING A MAGNET TO A LAMINATED CORE OF A ROTOR FOR AN ELECTRIC MOTOR

(71) Applicant: Schaeffler Technologies AG & Co. KG, Herzogenaurach (DE)

(72) Inventor: Stephan Niese, Schwaig b Nürnberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/954,097

(22) PCT Filed: Nov. 28, 2018

(86) PCT No.: PCT/DE2018/100963
§ 371 (c)(1),
(2) Date: Jun. 15, 2020

(87) PCT Pub. No.: WO2019/134723
PCT Pub. Date: Jul. 11, 2019

(65) Prior Publication Data
US 2021/0184524 A1    Jun. 17, 2021

(30) Foreign Application Priority Data

Jan. 5, 2018 (DE) .................... 10 2018 100 167.3
Nov. 27, 2018 (DE) .................... 10 2018 129 877.3

(51) Int. Cl.
*H02K 15/02* (2006.01)
*H02K 1/28* (2006.01)
(Continued)

(52) U.S. Cl.
CPC ............... *H02K 1/28* (2013.01); *H02K 1/278* (2013.01); *H02K 15/03* (2013.01); *Y10T 29/49012* (2015.01)

(58) Field of Classification Search
CPC .......... B22F 2202/05; Y10T 29/49009; Y10T 29/49012; H02K 15/03; H02K 15/067; H02K 15/14; H02K 1/276
(Continued)

(56) References Cited

U.S. PATENT DOCUMENTS 3,598,647 A    8/1971   Von Allen et al.
3,727,302 A    4/1973   Phelon
(Continued)

FOREIGN PATENT DOCUMENTS

CN    101510708 A    8/2009
CN    102088225 A    6/2011
(Continued)

*Primary Examiner* — Thiem D Phan
(74) *Attorney, Agent, or Firm* — Antun Peakovic

(57) ABSTRACT

A method for fastening a magnet to a laminated core of a rotor for an electric motor includes providing the magnet and the laminated core, providing an adhesive tape, and winding the adhesive tape around the magnet to form a bondable magnet. The adhesive tape includes a backing tape formed by an open-pored nonwoven material, and an adhesive that coats only one side of the backing tape at room temperature and penetrates the open-pored nonwoven material and bonds to the laminated core of the rotor when a temperature of the adhesive is increased by at least 20° C. relative to room temperature. The laminated core may include a cavity for the bondable magnet, and the method may include the step of inserting or fitting the bondable magnet into the cavity. The bondable magnet may be inserted or fitted into the cavity without stress or mostly without stress.

10 Claims, 3 Drawing Sheets

(51) Int. Cl.
*H02K 1/278* (2022.01)
*H02K 15/03* (2006.01)

(58) Field of Classification Search
USPC .................. 29/598, 522.1, 596, 607, 609
See application file for complete search history.

(56) References Cited

U.S. PATENT DOCUMENTS

| | | | |
|---|---|---|---|
| 5,201,111 A | 4/1993 | Prohaska | |
| 5,936,323 A | 8/1999 | Shibukawa et al. | |
| 2006/0273679 A1 | 12/2006 | Iwase et al. | |
| 2008/0238242 A1* | 10/2008 | Yoshizawa | H02K 19/22 |
| | | | 310/216.004 |
| 2014/0028139 A1* | 1/2014 | Hamer | H02K 1/2766 |
| | | | 310/156.11 |
| 2017/0302141 A1 | 10/2017 | Yokota et al. | |

FOREIGN PATENT DOCUMENTS

| | | | |
|---|---|---|---|
| CN | 103975506 A | | 8/2014 |
| CN | 104321953 A | | 1/2015 |
| CN | 105229898 A | | 1/2016 |
| CN | 107302291 A | | 10/2017 |
| DE | 10349442 A1 | | 5/2005 |
| DE | 102006049866 A1 | | 4/2008 |
| DE | 102011117946 A1 | | 5/2013 |
| JP | 09163649 | * | 6/1997 |
| JP | 9163649 A | | 6/1997 |
| JP | 2002272033 | | 9/2002 |
| JP | 2007060836 A | | 3/2007 |
| JP | 2007174872 A | | 7/2007 |
| JP | 2013009499 A | | 1/2013 |
| JP | 6095827 B1 | | 3/2017 |
| JP | 2017163734 A | | 9/2017 |
| JP | 8219992 A | | 9/2018 |
| WO | 2013013128 A2 | | 1/2013 |
| WO | 2014018720 A1 | | 1/2014 |

* cited by examiner

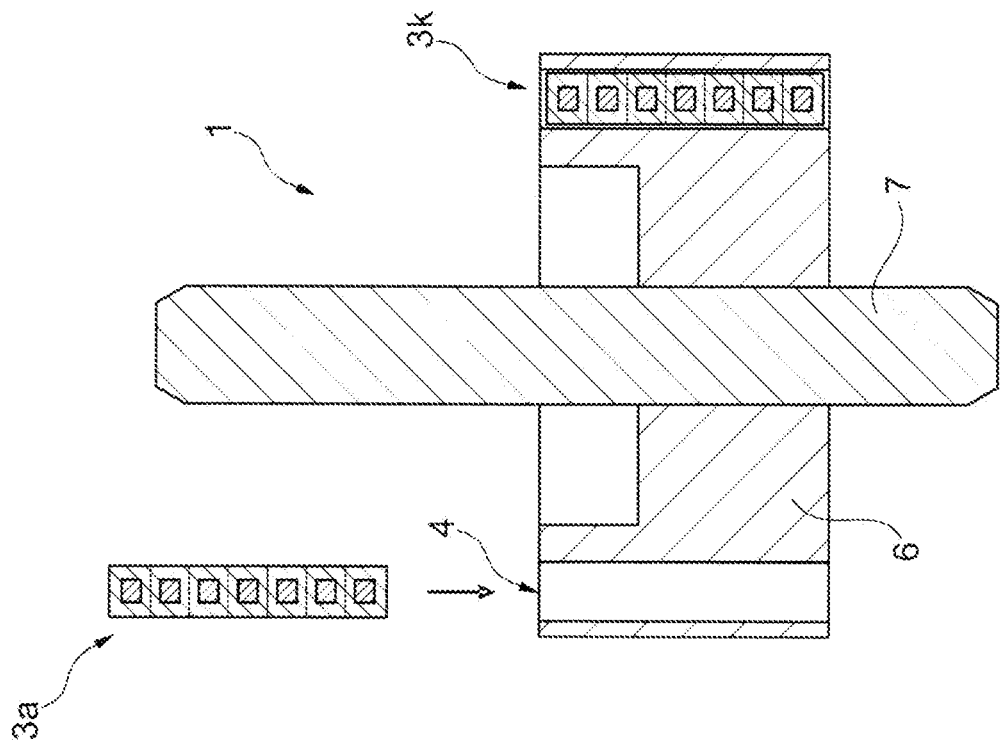
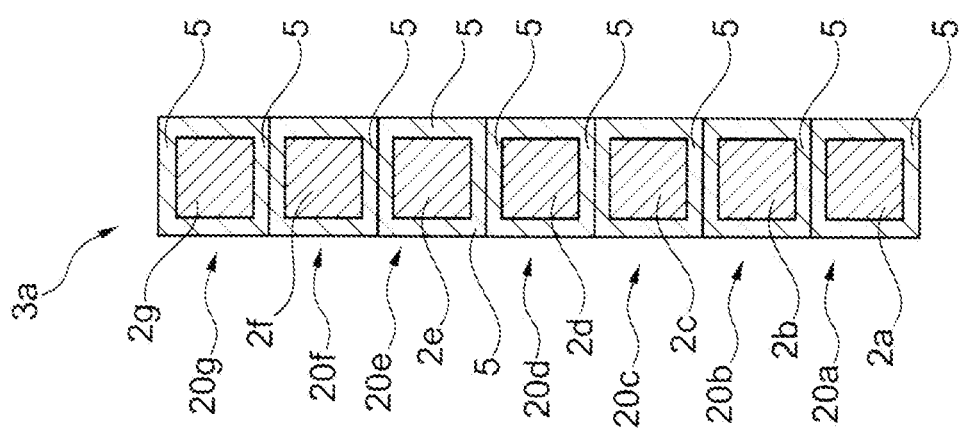
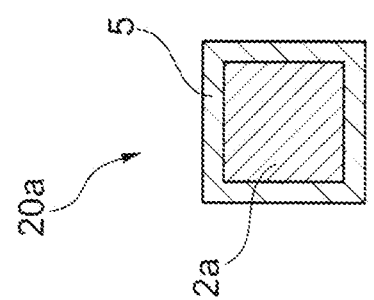
Fig. 2c
Fig. 2b
Fig. 2a

METHOD FOR FASTENING A MAGNET TO A LAMINATED CORE OF A ROTOR FOR AN ELECTRIC MOTOR

CROSS-REFERENCE TO RELATED APPLICATIONS

This application is the United States National Phase of PCT Appln. No. PCT/DE2018/100963 filed Nov. 28, 2018, which claims priority to German Application Nos. DE102018100167.3 filed Jan. 5, 2018 and DE10208129877.3 filed Nov. 27, 2018, the entire disclosures of which are incorporated by reference herein.

TECHNICAL FIELD

The disclosure relates to a method for fastening at least one magnet to a laminated core of a rotor for an electric motor. An adhesive tape is wound around the at least one magnet, forming at least one bondable magnet. The adhesive tape includes a backing tape and at least one adhesive. The disclosure furthermore relates to a rotor and to an electric motor having the rotor.

BACKGROUND

Methods for fastening magnets to laminated cores to form a rotor are already known from the prior art. In addition to the possibility of pressing magnets into the corresponding cavities or staking them therein, there is also a known practice of bonding the magnets to the rotor or into the cavities of the rotor using liquid adhesive.

DE 10 2011 117 946 A1, for example, describes a method for applying a magnet pole to a rotor, comprising the following steps: sticking a temporary adhesive, e.g. in the form of a double-sided adhesive tape, to a flat surface of an application tool, fitting the application tool on the temporary adhesive with at least one magnet, and applying the at least one magnet by means of a pressure unit to the rotor, which is provided with an application adhesive.

DE 10 2006 049 866 A1 discloses an electric machine having a stator with a winding system, which is arranged in grooves, and having a rotor, on the surface of which permanent magnets are arranged. The permanent magnets are fixed and positioned on the surface of the rotor by at least two different fastening means. The at least two fastening means are a double-sided adhesive tape and a liquid adhesive.

U.S. Pat. No. 3,727,302 A as well as JP 9 163 649 A2 describe fastening of magnets by means of a double-sided adhesive tape. It is problematic here that the handling and introduction of a magnet connected to a double-sided adhesive tape into the openings of a rotor is difficult owing to the sticky surface of the adhesive tape facing the rotor.

SUMMARY

A method for fastening a magnet, one. g., a permanent magnet, to a laminated core of a rotor for an electric motor is proposed. The electric motor is designed for driving a vehicle, e.g., an electric vehicle for passenger transport, and can be integrated into the vehicle for this purpose. The rotor is, for example, a rotating, magnetically acting element of the electric motor. Normally, the electric motor also includes a stator, a fixed element which is wound with copper wire coils. The rotor and, for example, also the stator, may be formed from a number of core plates, which are stamped and stacked to form laminated cores. More specifically, each of the core plates is provided with an insulating layer in relation to the other core plate. As an option, the electric motor draws electric energy from a traction battery of the vehicle. When current is flowing through the copper wire coils of the stator, it gives rise to magnetic fields, which are followed by the permanent magnets of the rotor, with the result that the rotor rotates. Rotations of the rotor may be transmitted via a transmission to a driven axle in order to drive wheels of the vehicle.

According to the disclosure, adhesive tape is wound around the magnet. The magnet may be completely wound with the adhesive tape. At least one bondable magnet is thereby formed. The bondable magnet can be fastened in a corresponding cavity of the rotor by an adhesive bond.

The adhesive tape includes a backing tape and an adhesive. According to the disclosure, the backing tape is formed by an open-pored nonwoven material, which is coated with the adhesive on only one side at room temperature. The adhesive penetrates the open-pored nonwoven material and bonds to the laminated core of the rotor when the temperature increases by at least 20° C. relative to room temperature.

Here, that side of the adhesive tape which is sticky at room temperature faces the magnet in use. This is advantageous since the nonwoven material is not sticky on the side facing the rotor and thus allows exact positioning of the bondable magnet in the cavity of the rotor. The introduction of the bondable magnet into a cavity of the rotor and positioning within the cavity are thus simplified. Fixing in the cavity is accomplished by simply heating the arrangement of the laminated core and the bondable magnet. A viscosity of the adhesive falls and, in this state, the adhesive is capable of penetrating the nonwoven material and flowing in the direction of the laminated core, where bonding to said core takes place. When the arrangement cools, the adhesive cures, and a permanent and strong bond between the magnet and the laminated core or between the magnet and the rotor is formed.

According to the known prior art, a further adhesive, e.g. liquid adhesive, is used in addition to a double-sided adhesive tape with two sticky and therefore difficult-to-handle sides in order to fasten magnets to a rotor. This is time-consuming and expensive owing to complex metering technology, process monitoring and process development. In particular, it must be ensured that the further adhesive penetrates into all regions of the cavity and wets the side walls in order to reliably insulate and fix the magnets.

By virtue of the method according to the disclosure and the rotor according to the disclosure, it is possible to dispense with adhesive on one side of the adhesive tape and to avoid the use of liquid adhesive, which furthermore leads to a cost saving.

The nonwoven material may be a textile material, which, for example, has a thickness in the range of 50 to 150 µm.

In an example embodiment of the disclosure, the laminated core has a cavity for the bondable magnet. An example method step envisages that the bondable magnet is inserted and/or fitted into the cavity.

An alternative method step envisages that a plurality of bondable magnets are positioned in a row and/or stacked one on top of the other. At least one layer of the adhesive tape may be arranged between each of the magnets and on the outsides of the magnets. A bondable magnet assembly comprising at least two, three, four or more bondable magnets may be formed. The bondable magnet assembly is inserted into the corresponding cavity of the rotor. Thus, the method according to the disclosure offers the advantage that it is possible to fit not just one magnet per cavity but several magnets at the same time, especially in the embodiment as the magnet assembly. The formation of the magnet assembly can be accomplished in a simple and low-cost manner. Because the magnet assembly is inserted and/or fitted into the cavity as a whole, it is possible to dispense with complex templates or aids for the accurately positioned insertion of individual magnets.

Because the bondable magnet or the magnet assembly is completely wound with the adhesive tape, it is possible, for example, to prevent a risk of adhesive-free locations between the magnet or the magnet assembly and insides of the respective cavity. It is thereby possible to ensure secure fixing in the cavity. Unwanted release of the magnet or of the magnet assembly from the cavity and resulting troublesome noise or damage of the rotor can be avoided. Moreover, the bondable magnet or the magnet assembly can be electrically insulated from the environment in a reliable manner by virtue of being completely wound with the adhesive tape. It is thereby possible to ensure the performance capability of the magnet or magnet assembly and to avoid malfunctions of the rotor.

The bondable magnet or the magnet assembly may be inserted without stress or mostly without stress into the cavity. For this purpose, the cavity may have dimensions which very largely correspond to, for example equal, those of the magnet or the magnet assembly. Fitting of the bondable magnet or of the magnet assembly in a transition fit or clearance fit in the cavity is possible.

In another example method step, the laminated core with the bondable magnet inserted into the respective cavity or with the magnet assembly inserted into the respective cavity is heated. The laminated core and the bondable magnet or magnet assembly may be heated inductively. During this process, the adhesive liquefies and penetrates through the nonwoven material in order to form the bond between the magnet/magnet assembly and the laminated core.

An example embodiment of the disclosure envisages that the adhesive tape includes at least one adhesive in the form of a reaction resin, e.g. a phenolic resin and/or an epoxy resin. The adhesive tape may include at least two adhesives in combination. A first side of the adhesive tape, which, in particular, is directed toward the magnet/s and/or makes contact with the latter, may be coated. The adhesive liquefies at least partially during the inductive heating, or melts, for example. As a result, the magnet or magnet assembly is bonded in the cavity with the laminated core, e.g., in one cavity.

In order to produce a defined contact pressure of the bondable magnets or magnet assemblies relative to the laminated core, the rotor may be set in rotation during the bonding process. Here, the choice of rotation speed has an effect on the level of the contact pressure, i.e. the higher the rotation speed, the higher the contact pressure. This improves the formation of a homogeneous and uniform bond.

Another method step includes cooling of the laminated core which has previously been heated together with the bondable magnet or magnet assembly arranged in the optionally present corresponding cavity. By virtue of the fact that and/or while the laminated core is being cooled, the adhesive bond produced by the at least one adhesive between the magnet or magnet assembly and the laminated core is cured, thus ensuring that the magnet or magnet assembly is securely fastened to the laminated core, e.g., in a cavity of the laminated core.

At this point, it should be mentioned that an already magnetized component composed of a magnet material with magnetic properties can be used as a "magnet" in the sense according to the present disclosure. As an alternative, however, it is also possible for a magnet in the form of a component which is formed from a not yet magnetized magnet material to be bonded. Magnetization of the magnet material, in which magnetic properties are formed, then takes place after bonding to the laminated core. Accordingly, it is possible for the magnet or the magnet assembly to be magnetized and to acquire magnetic properties after bonding to the laminated core.

After the cooling of the laminated core and of the fitted magnet or magnet assembly, the rotor is finished. It can be integrated into an electric motor to drive the vehicle. Another subject of the disclosure is formed by a rotor having at least one magnet. The at least one magnet is fastened to the laminated core to form the rotor by the method according to the disclosure.

An electric motor for a vehicle, e.g. for a passenger car, for example an electric vehicle, having the rotor according to the disclosure forms another subject of the disclosure. The electric motor optionally includes the stator which produces magnetic fields that cause the rotation of the rotor when an electric current is applied.

In an example embodiment of the disclosure, the electric motor for driving the vehicle can be integrated into the latter. For example, the electric motor is designed to produce a traction torque or at least some of the traction torque for wheels of the vehicle. More specifically, the electric motor can be coupled mechanically to the wheels, e.g. via a reduction gear unit and driveshafts or, alternatively, via a shift transmission. As an alternative, the electric motor can be integrated into the respective wheel and can thus be designed as a wheel hub motor.

BRIEF DESCRIPTION OF THE DRAWINGS

Further features, advantages and effects of the disclosure will become apparent from the following description of illustrative embodiments of the disclosure. In the drawings:

FIG. 2a shows a method step of a method for fastening a magnet to the rotor in FIG. 1, wherein an adhesive tape is being wound around a magnet;

FIG. 2b shows a further method step of the method, wherein magnets wound with the adhesive tape are stacked one on top of the other to form a magnet assembly;

FIG. 2c shows an additional method step, in which the magnet assembly is fitted in a cavity of the rotor;

DETAILED DESCRIPTION

Figure 1:
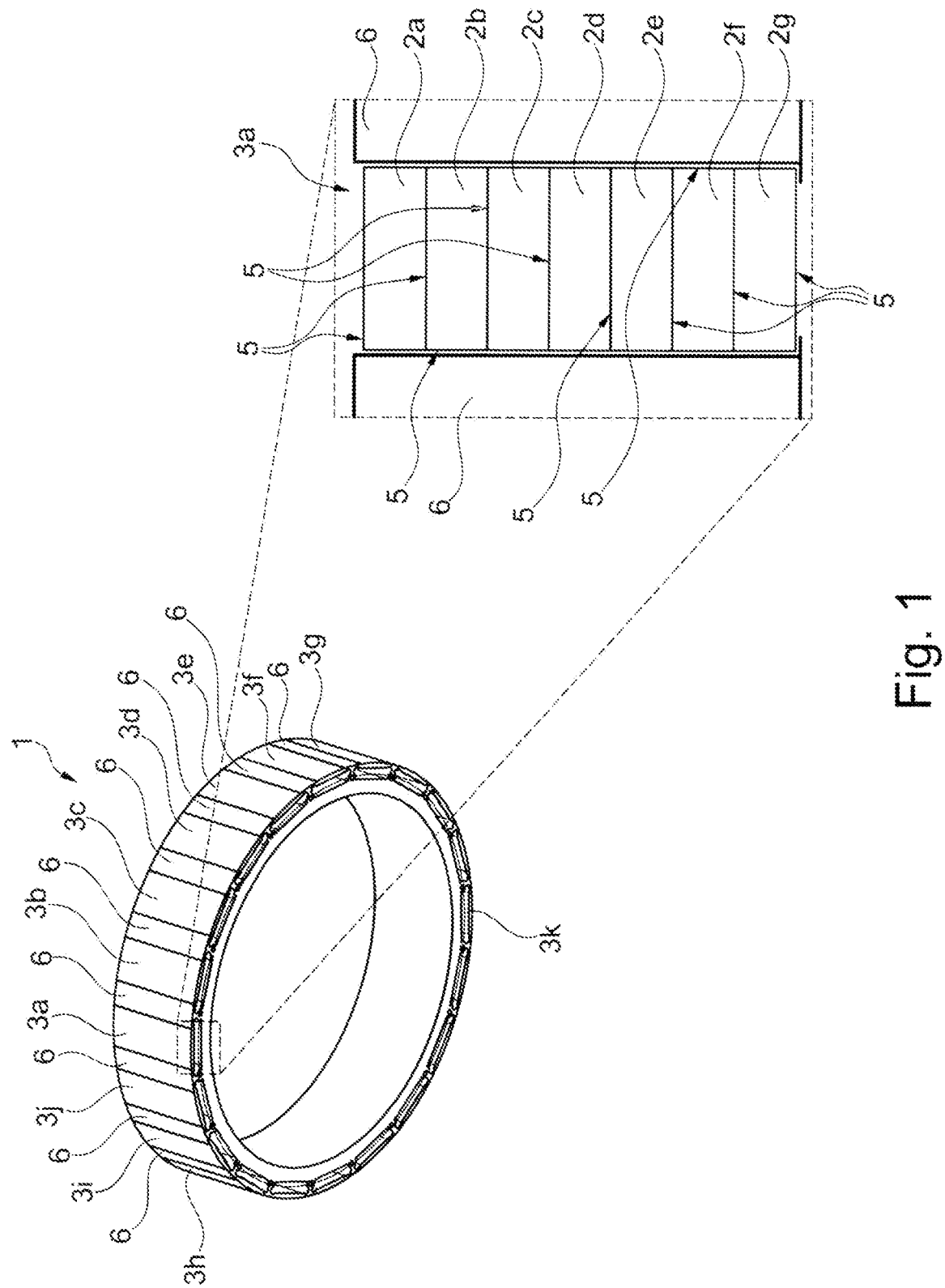
FIG. 1 shows a perspective side view of a rotor with magnet assemblies and a plan view of a segment of one end of the rotor.

FIG. 1 shows a perspective side view of a rotor 1 having a plurality of magnet assemblies 3a, 3b, 3c, 3d, 3e, 3f, 3g, 3h, 3i, 3j, 3k. FIG. 1 furthermore shows an enlarged segment of an end of the rotor 1, starting from which a first magnet assembly 3a is integrated into a corresponding cavity 4 (FIG. 2c) in the rotor 1.

The rotor 1 includes a laminated core 6, which is formed from core plates. It is designed for integration into an electric motor. The electric motor is designed for integration into an electric vehicle, e.g., an electrically driven passenger car. There, it is provided for the purpose of producing traction torques for driving the wheels of the vehicle.

Cavities 4 are introduced into the laminated core 6 of the rotor 1. These are stamped into the core assembly 6, for example. A magnet assembly 3a, 3b, 3c, 3d, 3e, 3f, 3g, 3h, 3i, 3j, 3k is introduced and/or fitted without stress or mostly without stress into each cavity 4 and bonded.

Each magnet assembly 3a, 3b, 3c, 3d, 3e, 3f, 3g, 3h, 3i, 3j, 3k includes a plurality of magnets, e.g. seven magnets 2a, 2b, 2c, 2d, 2e, 2f, 2g. The magnets are permanent magnets. Each of the magnets 2a, 2b, 2c, 2d, 2e, 2f, 2g is surrounded completely by an adhesive tape 5, and, as a result, bondable magnets 20a, 20b, 20c, 20d, 20e, 20f, 20g are formed. Each magnet assembly 3a, 3b, 3c, 3d, 3e, 3f, 3g, 3h, 3i, 3j, 3k is formed by juxtaposing and/or stacking the bondable magnets 20a, 20b, 20c, 20d, 20e, 20f, 20g. Thus, the adhesive tape 5 completely surrounds the outsides of the respective magnet assembly 3a, 3b, 3c, 3d, 3e, 3f, 3g, 3h, 3i, 3j, 3k, thereby making said assembly bondable. At least one ply of the adhesive tape 5 is arranged without interruption between the individual bondable magnets 20a, 20b, 20c, 20d, 20e, 20f, 20g.

The adhesive tape 5 includes a backing tape composed of nonwoven material, which is coated with at least one adhesive, preferably with two different adhesives. Here, therefore, phenolic resin and epoxy resin are applied on one side of the backing material. The side on which the at least one adhesive is applied faces the respective magnet 2a, 2b, 2c, 2d, 2e, 2f, 2g and makes contact with the latter. The uncoated side of the backing tape forms the outside of the respective bondable magnet 20a, 20b, 20c, 20d, 20e, 20f, 20g. FIGS. 2a-2f show an illustration of individual method steps of a method by which the magnets 2a, 2b, 2c, 2d, 2e, 2f, 2g are combined to form a first magnet assembly 3a. The fastening of the first magnet assembly 3a to the laminated core 6 in corresponding method steps of the method is furthermore illustrated.

A first bondable magnet 20a is shown in FIG. 2a. The first bondable magnet 20a is formed from a first magnet 2a and the adhesive tape 5. To form the bondable magnet 20a, said tape is wound around the first magnet 2a, and therefore the adhesive tape 5 surrounds the magnet 2a completely and without interruption.

FIG. 2b shows the first magnet assembly 3a. The first bondable magnet 20a is formed by winding the adhesive tape 5 around each of the magnets 2a, 2b, 2c, 2d, 2e, 2f, 2g and then arranging the bondable magnets 20a, 20b, 20c, 20d, 20e, 20f, 20g in a row or stacking them one on top of the other. All the other bondable magnet assemblies 3b, 3c, 3d, 3e, 3f, 3g, 3h, 3i, 3j, 3k are formed in the same way.

It is thus possible, in a manner which is simple and saves manufacturing time, to combine a plurality of bondable magnets 20a, 20b, 20c, 20d, 20e, 20f, 20g, e.g., an unlimited number of magnets, to form the magnet assemblies 3a, 3b, 3c, 3d, 3e, 3f, 3g, 3h, 3i, 3j, 3k, which can then be fitted as units into the corresponding cavities 4 of the laminated core 6 of the rotor 1 and bonded therein. Moreover, it is possible to dispense with the use of auxiliary tools and templates for fitting the individual bondable magnets 20a, 20b, 20c, 20d, 20e, 20f, 20g into the cavities 4. In contrast to the use of liquid adhesive, as known from the prior art, there is no significant metering technology, process monitoring and process development required since the complete winding of the individual magnets 20a, 20b, 20c, 20d, 20e, 20f, 20g with the adhesive tape 5 ensures full-surface bonding to insides of the cavity 4 and, as a result, the risk of unbonded locations is prevented. In particular, it is thereby possible to save manufacturing time and costs. Another advantage of the use of the adhesive tape 5 is that it entails lower costs than conventionally used liquid adhesive.

FIG. 2c shows a section through the laminated core 6 of the rotor 1 along an axis of rotation 7 about which the subsequent rotor 1 can be rotated. Two cavities 4 are shown, wherein another magnet assembly 3k has already been fitted into one of the two cavities 4. The first magnet assembly 3a is inserted into the cavity 4 which is still free. Like all the other magnet assemblies 3b, 3c, 3d, 3e, 3f, 3g, 3h, 3i, 3j, 3k it is fitted into the cavity 4 in such a way that a transition fit is formed. Fluctuations in the size of the gap between the laminated core 6 and the magnet assemblies 3b, 3c, 3d, 3e, 3f, 3g, 3h, 3i, 3j, 3k can be compensated for by a flexible adhesive tape 5 and the selective application thereof. In this way, stresses between the laminated core 6 of the rotor 1 and the respective magnet assembly 3a, 3b, 3c, 3d, 3e, 3f, 3g, 3h, 3i, 3j, 3k can mostly be avoided. In particular, a risk of damage, change to technical properties and associated power losses of the magnets 2a, 2b, 2c, 2d, 2e, 2f, 2g caused by pressure stresses when the magnets 2a, 2b, 2c, 2d, 2e, 2f, 2g are pressed into the cavities 4 can be avoided.

Figure 2F:
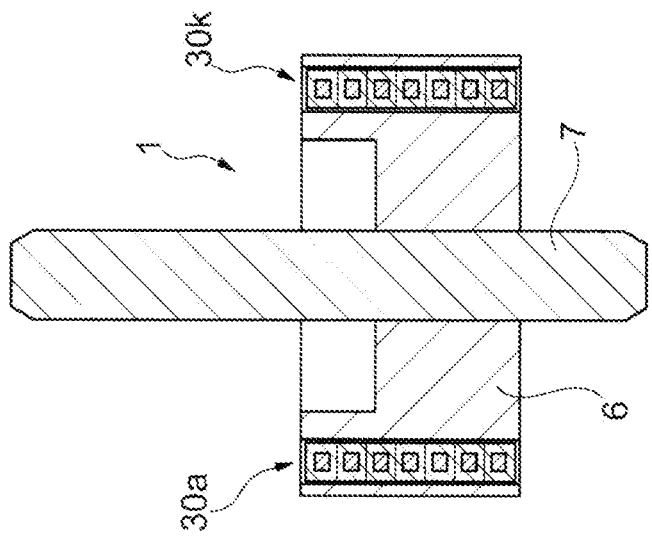
FIG. 2f shows the finished rotor, which can be integrated into an electric motor. In the figures, corresponding or identical parts are in each case provided with the same reference signs.
Figure 2E:
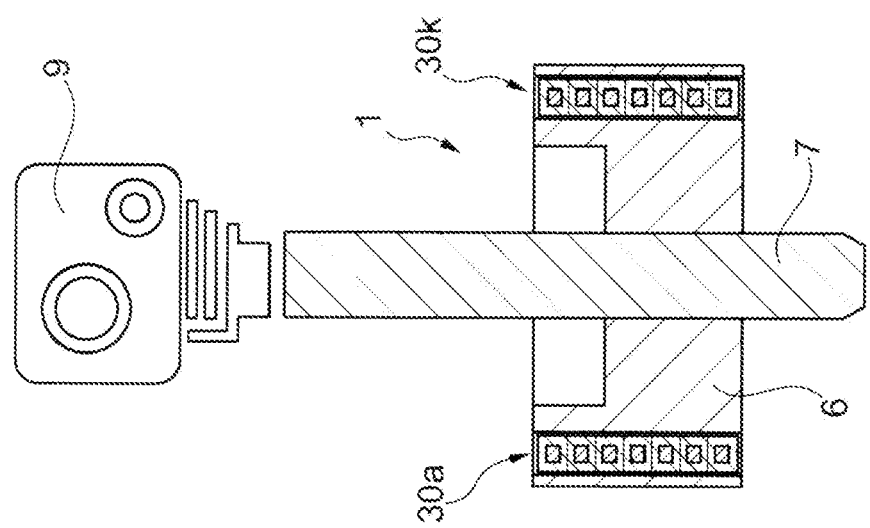
FIG. 2e shows an additional method step, in which the rotor with the fitted magnet assembly is cooled.
Figure 2D:
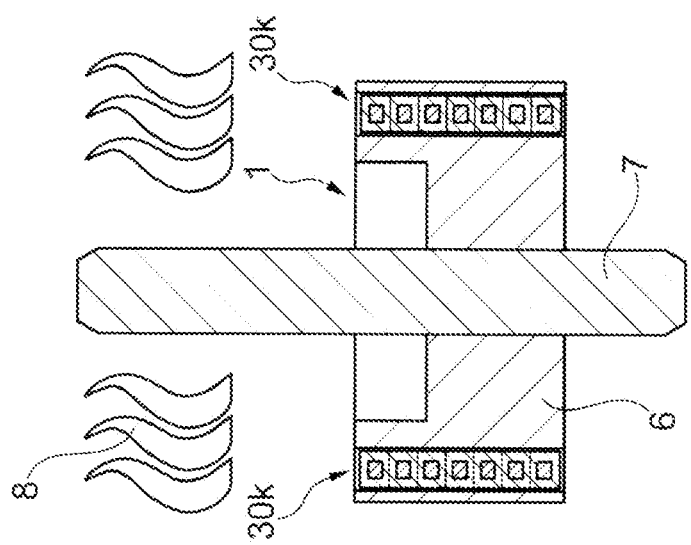
FIG. 2d shows a further method step, in which the rotor and the fitted magnet assembly are heated.

According to FIG. 2d, the first magnet assembly 3a, the further magnet assembly 3k and all the other magnet assemblies 3b, 3c, 3d, 3e, 3f, 3g, 3h, 3i, 3j (FIG. 1) are fitted into the corresponding cavities 4 of the laminated core 6. The laminated core 6 is then heated with the fitted magnet assemblies 3a, 3b, 3c, 3d, 3e, 3f, 3g, 3h, 3i, 3j, 3k by supplying inductive heat 8. As a result of the heat 8, the adhesive on the adhesive tape 5 is at least partially liquefied and/or melts. As a result, the bondable magnets 20a, 20b, 20c, 20d, 20e, 20f, 20g of the respective magnet assembly 3a, 3b, 3c, 3d, 3e, 3f, 3g, 3h, 3i, 3j, 3k are bonded to one another. These, in turn, are bonded to the side walls of the laminated core 6 in the corresponding cavity 4, with the result that they are fastened by a secure adhesive bond. In particular, the simply and easily applied adhesive tape 5 ensures that the magnets 2a, 2b, 2c, 2d, 2e, 2f, 2g are completely surrounded with adhesive after the inductive heating. It is thereby possible to avoid a situation where there is unwanted detachment of the now bonded magnet 21a, 21b, 21c, 21d, 21e, 21f, 21g or magnet assembly 30a, 30b, 30c, 30d, 30e, 30f, 30g, 30h, 30i, 30j, 30k in the corresponding cavity 4, this being associated with troublesome noise and/or damage of the finished rotor 1.

The adhesive of the adhesive tape 5, e.g., the two different adhesives, insulates the corresponding bonded magnet assemblies 30a, 30b, 30c, 30d, 30e, 30f, 30g, 30h, 30i, 30j, 30k electrically from the laminated core 6, and it is therefore possible to ensure an unrestricted functioning and performance capacity of the subsequent rotor 1 in the electric motor. Moreover, the electric insulating effect of the ensures that the bonded magnet assemblies 30a, 30b, 30c, 30d, 30e, 30f, 30g, 30h, 30i, 30j, 30k are protected from media in the environment, e.g. saltwater and/or transmission oil.

FIG. 2e shows another method step, in which the laminated core 6 is cooled by a cooling device 9. By means of the cooling, the adhesive bond between the individual bonded magnets 21a, 21b, 21c, 21d, 21e, 21f, 21g, the bonded magnet assemblies 30a, 30b, 30c, 30d, 30e, 30f, 30g, 30h, 30i, 30j, 30k and the side walls of the laminated core 6 in the respective cavity 4 is cured.

If the magnets 2a-g or magnet assemblies 3a-k are formed from a magnet material which does not yet have any magnetic properties, the cooling process may be followed by magnetization of the magnets 2a-g or magnet assemblies 3a-k, which imparts to them the required magnetic properties.

FIG. 2f shows the rotor 1 produced from the laminated core 6 and the magnet assemblies 30a, 30b, 30c, 30d, 30e, 30f, 30g, 30h, 30i, 30j, 30k in the form in which it can be integrated into an electric motor. In the electric motor, the rotor 1 forms a rotating, magnetically acting element which is in magnetic operative connection with a stator of the electric motor. The stator is formed from a core plate assembly, around which copper wire coils are wound. When the stator is supplied with electric energy, e.g. from a traction battery of the vehicle, the rotor rotates due to the current flow through the copper wire coils and the magnetic fields generated thereby. The torque of the rotor is converted by a transmission of the vehicle and transmitted to a driven axle of the vehicle, with the result that the wheels of the vehicle are driven.

REFERENCE NUMERALS 1 rotor
2a-g magnet
3a-k magnet assembly
4 cavity
5 adhesive tape
6 laminated core
7 axis of rotation
8 inductive heat supply
9 cooling unit
20a-g bondable magnet
21a-g bonded magnet
30a-k bonded magnet assembly

The invention claimed is:

1. A method for fastening a magnet to a laminated core of a rotor for an electric motor, comprising:
providing the magnet and the laminated core, the core defining a cavity;
providing an adhesive tape comprising:
a backing tape formed by an open-pored nonwoven material; and
an adhesive that coats only one side of the backing tape at room temperature and penetrates the open-pored nonwoven material and bonds to the laminated core of the rotor when a temperature of the adhesive is increased by at least 20° C. relative to room temperature;
winding the adhesive tape around the magnet to form a bondable magnet;
forming a bondable magnet assembly by positioning a plurality of bondable magnets in a row or stacking a plurality of bondable magnets on top of one another; and
inserting or fitting the bondable magnet assembly into the cavity.

2. The method of claim 1 further comprising the step of magnetizing the bondable magnet after the bond is formed.

3. The method of claim 1, the bondable magnet assembly is inserted or fitted into the cavity without stress or mostly without stress.

4. The method of claim 1 further comprising the step of inductive heating the laminated core.

5. The method of claim 4, wherein, during the inductive heating, the at least a portion of the adhesive liquifies or melts to form a bond between the bondable magnet assembly and the laminated core.

6. The method of claim 5 further comprising the step of cooling the laminated core to cure the bond.

7. The method of claim 1, wherein the adhesive comprises a reaction resin.

8. The method of claim 7, wherein the reaction resin is an epoxy resin.

9. A rotor comprising the magnet fastened to the laminated core by the method of claim 1.

10. An electric motor for a vehicle comprising the rotor of claim 9.

* * * * *